United States Patent [19]

Chang

[11] Patent Number: 5,327,807
[45] Date of Patent: Jul. 12, 1994

[54] SCROLL SAW WITH SAW BLADE FASTENING AND TENSION ADJUSTING DEVICE

[75] Inventor: Chiu-Tsun Chang, Taichung City, Taiwan

[73] Assignee: P & F Brother Industrial Corporation, Taichung City, Taiwan

[21] Appl. No.: 110,049

[22] Filed: Aug. 20, 1993

[51] Int. Cl.⁵ .................... B23D 49/04; B27B 19/02
[52] U.S. Cl. ......................... 83/783; 83/581.1
[58] Field of Search ............... 83/581.1, 783, 781, 83/782, 662, 698, 786

[56] References Cited

U.S. PATENT DOCUMENTS

| | | | |
|---|---|---|---|
| 805,266 | 11/1905 | Cunningham | 83/581.1 |
| 4,503,742 | 3/1985 | Sutton | 83/581.1 |
| 4,681,006 | 7/1987 | Miller | 83/581.1 |
| 4,949,616 | 8/1990 | Chang | 83/783 |
| 5,016,512 | 5/1991 | Huang | 83/783 |
| 5,018,420 | 5/1991 | Plomb | 83/783 |

Primary Examiner—Scott Smith

[57] ABSTRACT

A scroll saw includes a pair of spaced generally parallel upper and lower arms, a saw blade, and a saw blade fastening and tension adjusting device for securing the saw blade between the upper and lower arms. The adjusting device includes a channel, an elongated blade support, upper and lower blade holders, and an adjustment unit. The channel opens downwardly and is formed on a distal end of the upper arm. The blade support has an inner end which extends into the channel and which is connected pivotally to spaced side plates of the channel. The upper blade holder is mounted on a distal end of the blade support, while the lower blade holder is mounted on the distal end of the lower arm. The upper and lower blade holders hold removably and respectively two ends of the saw blade. The adjustment unit includes a compression spring, a connecting post and a lever. The spring is disposed between a top plate of the channel and a top surface of the blade support. The connecting post has a threaded lower end which extends through the channel and the compression spring and which is connected threadedly to the blade support. The lever has a front portion which is provided with a cam surface that abuts against the top plate of the channel and which is mounted pivotally on the connecting post.

2 Claims, 6 Drawing Sheets

SCROLL SAW WITH SAW BLADE FASTENING AND TENSION ADJUSTING DEVICE

BACKGROUND OF THE INVENTION

1. Field of the Invention

The invention relates to a scroll saw, more particularly to a scroll saw with a saw blade fastening and tension adjusting device that facilitates attachment and removal of a saw blade.

2. Description of the Related Art

FIG. 1 illustrates a saw blade fastening and tension adjusting device of a conventional scroll saw 10. The device comprises an adjustment unit 11 which is mounted on a distal end of an upper arm (12a) of the scroll saw 10 and which includes a rotary knob 111 and a connecting post 112. The connecting post 112 has an upper portion which is connected threadedly to the rotary knob 111 and a lower portion which extends through an upright hole 121 in the upper arm (12a) and which carries an upper blade holder clip 141 thereon. A compression spring 15 is provided around the lower portion of the connecting post 112 and is disposed between the upper arm (12a) and the upper blade holder clip 141. A lower blade holder clip 142 is mounted on a distal end of a lower arm (12b) of the scroll saw 10. A saw blade 13 extends between the upper and lower blade holder clips 141, 142 and has two ends which are retained removably by the latter.

The rotary knob 111 is rotated in a first direction in order to move the connecting post 112 and the upper blade holder clip 141 upwardly, thereby compressing the compression spring 15. The distance between the blade holder clips 141, 142 increases, thereby increasing the tension of the saw blade 13. When the rotary knob 111 is rotated in a second opposite direction, the connecting post 112 and the upper blade holder clip 141 move downwardly, thereby causing the compression spring 15 to expand. The distance between the blade holder clips 141, 142 is decreased, thereby loosening the tension of the saw blade 13 so as to permit removal of the saw blade 13 from the blade holder clips 141, 142.

Note that in the above described device, quick attachment or removal of the saw blade 13 is not possible because of the need to rotate the rotary knob 111 before the upper blade holder clip 141 can be moved toward or away from the lower blade holder clip 142. Likewise, proper adjustment in the tension of the saw blade 13 cannot be conveniently conducted because of the above reason.

SUMMARY OF THE INVENTION

Therefore, the objective of the present invention is to provide a scroll saw with a saw blade fastening and tension adjusting device that facilitates attachment and removal of a saw blade and that facilitates proper adjustment of the tension of the saw blade.

Accordingly, the scroll saw of the present invention includes a generally C-shaped saw frame, a flat worktable, a pair of spaced generally parallel upper and lower arms mounted pivotally on the saw frame, each of the upper and lower arms having a distal end and extending along upper and lower sides of the worktable, a saw blade, and a saw blade fastening and tension adjusting device for securing the saw blade between the upper and lower arms.

The saw blade fastening and tension adjusting device comprises a channel, an elongated blade support, upper and lower blade holders, and an adjustment unit.

The channel opens downwardly and is formed on the distal end of the upper arm. The channel has a top plate which is formed with a through hole and spaced side plates. The blade support has an inner end which extends into the channel and which is connected pivotally to the spaced side plates. The blade support has a distal end and a top surface which is formed with a screw hole that is aligned with the through hole in the channel. The upper blade holder is mounted on the distal end of the blade support, while the lower blade holder is mounted on the distal end of the lower arm. The upper and lower blade holders hold removably and respectively two ends of the saw blade.

The adjustment unit includes: a compression spring disposed between the top plate of the channel and the top surface of the blade support; a connecting post having a threaded lower end which extends through the through hole in the channel and the compression spring and which engages threadedly the screw hole in the blade support; and a lever having a front portion which is provided with a cam surface that abuts against the top plate of the channel and which is mounted pivotally on the connecting post. The lever is operable to move the connecting post axially and cause the blade support to pivot in order to vary the distance between the upper and lower blade holders so as to adjust tension of the saw blade.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
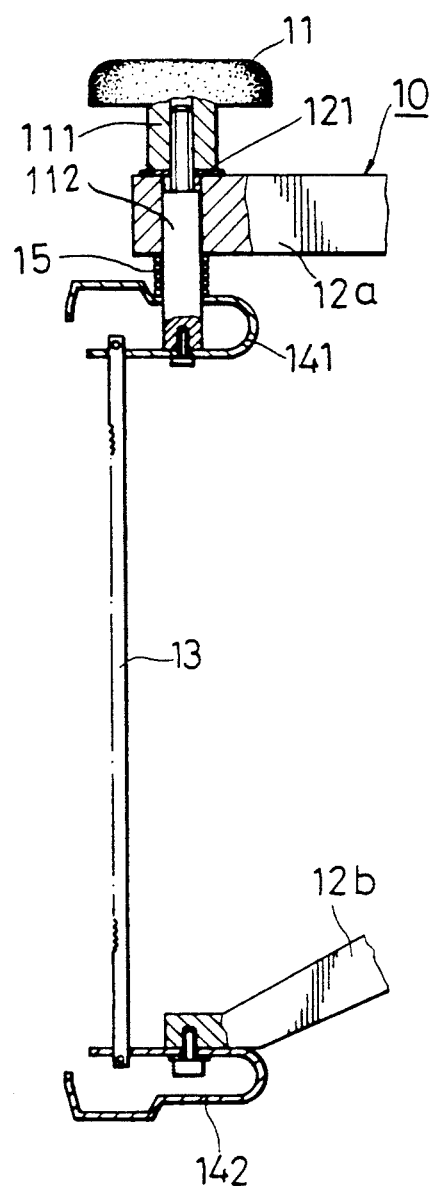
FIG. 1 shows a saw blade fastening and tension adjusting device of a conventional scroll saw.
Figure 2:
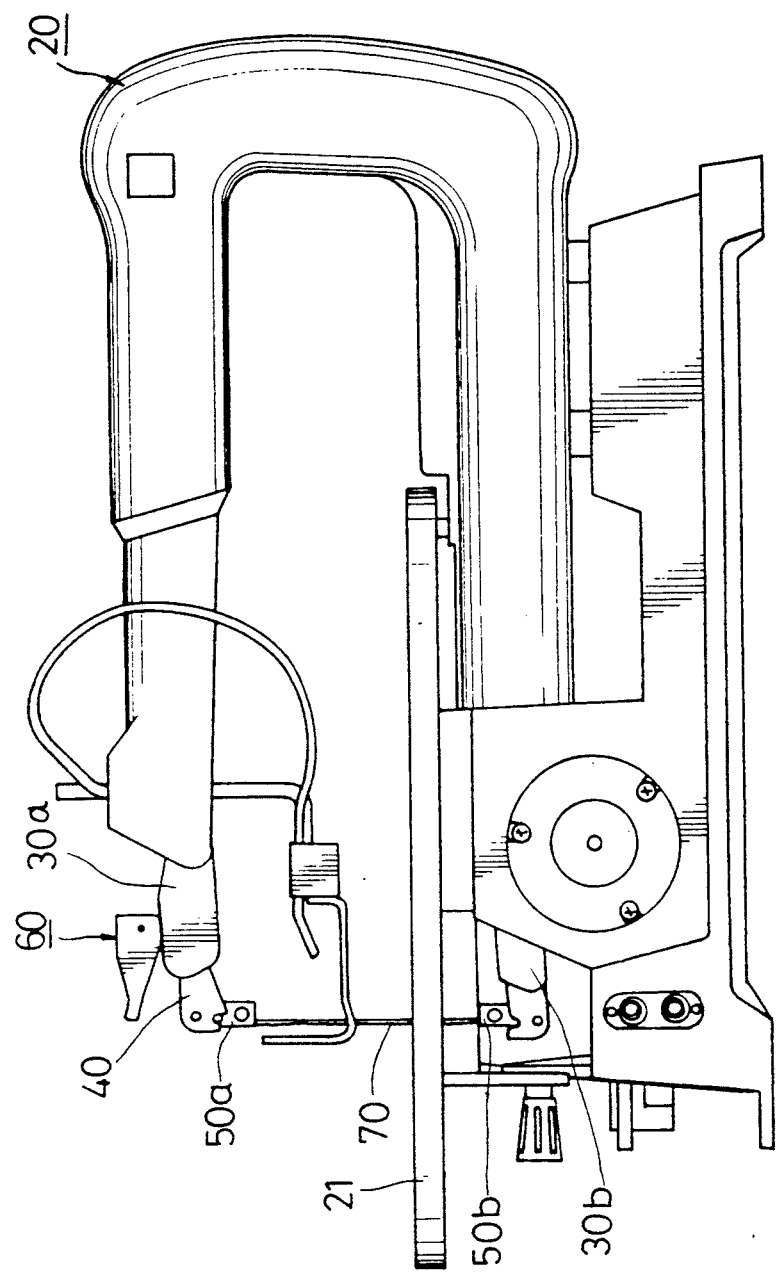
FIG. 2 is a side view of the preferred embodiment of a scroll saw with a saw blade fastening and tension adjusting device of the present invention.
Figure 3:
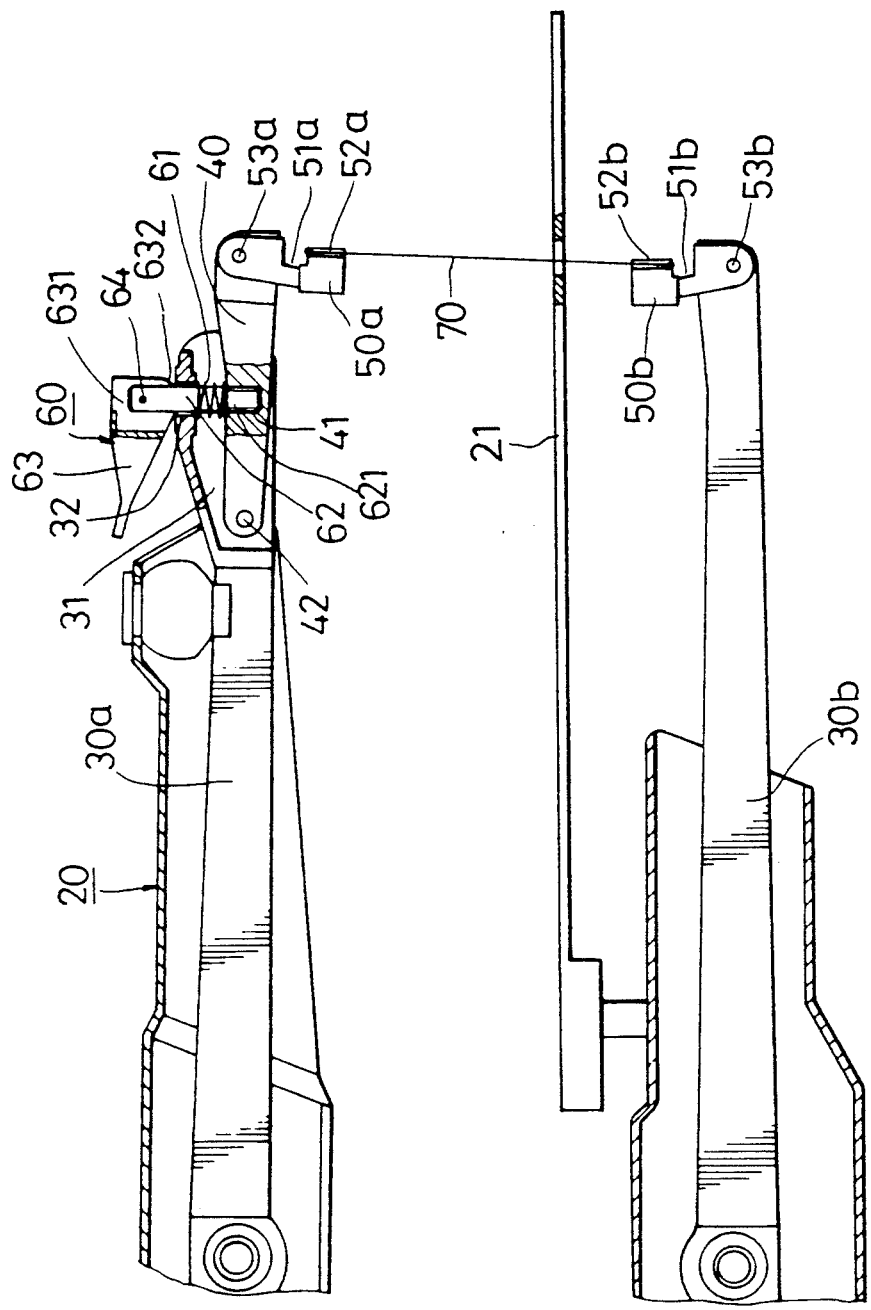
FIG. 3 is a fragmentary partly sectional view of the preferred embodiment when in a saw blade retaining state.
Figure 4:
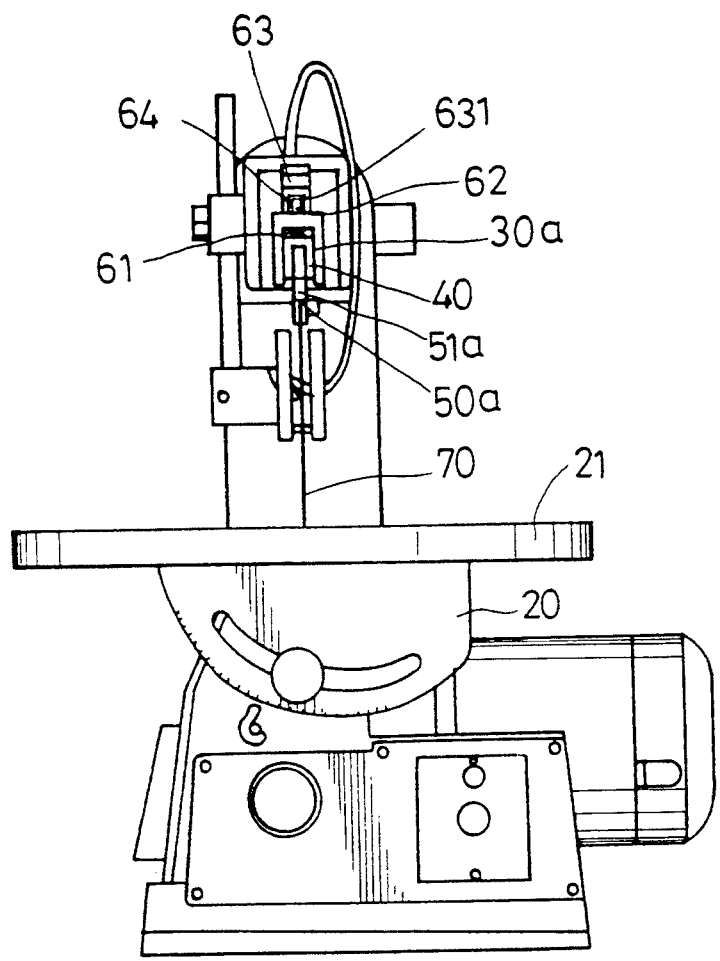
FIG. 4 is a front view of the preferred embodiment.

Referring to FIGS. 2 to 4, the preferred embodiment of a scroll saw according to the present invention is shown to comprise a generally C-shaped saw frame 20 and a flat worktable 21. A pair of spaced generally parallel upper and lower arms (30a, 30b) are mounted pivotally on the saw frame 20 and extend along upper and lower sides of the worktable 21. The upper arm (30a) has a distal end which is formed with a channel 31 that opens downwardly. The channel 31 has a top plate which is formed with a through hole 32. An elongated blade support 40 has an inner end 42 which extends into the channel 31 and which is connected pivotally to spaced side plates of the latter. The blade support 40 has a top surface which is formed with a screw hole 41 that is aligned with the through hole 32 of the channel 31. The bottom of a distal end of the blade support 40 is formed with a longitudinal slot which receives one end (53a) of an upper blade holder (50a). The lower arm (30b) has a distal end which is formed with a longitudinal slot that receives one end (53b) of a lower blade holder (50b). The blade holders (50a, 50b) are mounted pivotally to the respective one of the blade support 40 and the lower arm (30b). Each of the blade holders (50a, 50b) has a front edge which is formed with a notch (51a, 51b) and a slot (52a, 52b) that extends from the notch (51a, 51b) to a bottom edge of the blade holder (50a, 50b). An adjustment unit 60 includes a spring 61, a connecting post 62 and a lever 63.

In this embodiment, the spring 61 is a compression spring and is disposed between the channel 31 and the blade support 40. The connecting post 62 has a threaded lower end 621 which extends through the spring 61 and which engages threadedly the screw hole 41 in the blade support 40. The lever 63 has a channel-shaped front portion 631 which opens downwardly and which has a cam surface 632 that includes a curved face at a bottom edge of the front portion 631 and a flat face at a front edge of the front portion 631. The cam surface 632 of the lever 63 abuts against the top plate of the channel 31. The connecting post 62 has an upper end which extends into the front portion 631. The front portion 631 is mounted pivotally to the connecting post 62 by means of a pin 64.

Referring once more to FIG. 2, the upper and lower arms (30a, 30b) are mounted pivotally on the saw frame 20 and are incapable of shifting in a longitudinal direction. The two ends of a saw blade 70 are extended fittingly into the slot (52a, 52b) of a respective one of the blade holders (50a, 50b). The lever 63 is then operated to pull the connecting post 62 upwardly and cause upward pivoting movement of the blade support 40. The spring 61 is compressed, and the distance between the blade holders (50a, 50b) is increased, thereby increasing the tension of the saw blade 70.

Figure 5:
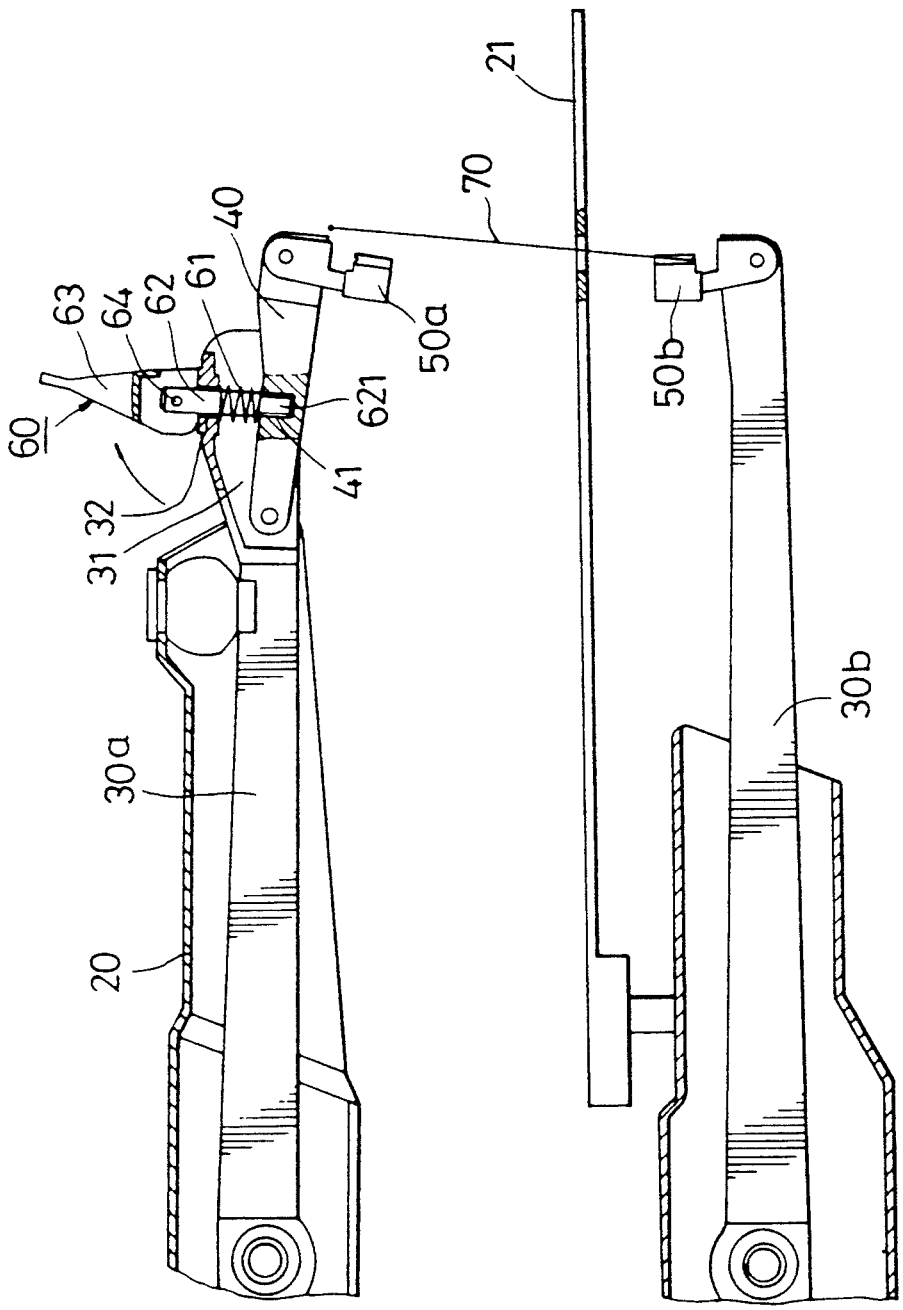
FIG. 5 is a fragmentary partly sectional view of the preferred embodiment when in a saw blade releasing state.

Referring to FIG. 5, when it is desired to replace the saw blade 70, the lever 63 is operated so that the flat face of the cam surface 632 abuts against the top plate of the channel 31. The connecting post 62 moves downwardly and permits expansion of the spring 61. The blade support 40 pivots downwardly, thereby reducing the distance between the blade holders (50a, 50b). The tension of the saw blade 70 is loosened, and the two ends of the saw blade 70 extend into the notch (51a, 51b) of the respective blade holder (50a, 50b). Removal of the saw blade 70 is permitted at this stage.

Figure 6:
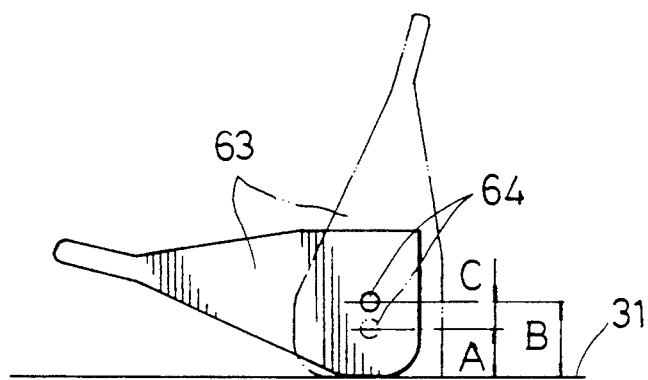
FIG. 6 illustrates the movement of a lever of the saw blade fastening and tension adjusting device of the preferred embodiment.

Referring to FIGS. 4 to 6, when the lever 63 is operated so that the flat face of the cam surface 632 abuts the top plate of the channel 31, the pin 64 is displaced by a distance (A) from the top plate of the channel 31. The distance between the blade holders (50a, 50b) is shorter to permit installation and removal of the saw blade 70. When the lever 63 is operated so that the curved face of the cam surface 632 abuts the top plate of the channel 31, the pin 64 is displaced by a longer distance (B) from the top plate of the channel 31. The connecting post 62 moves upwardly to cause upward pivoting movement of the blade support 40. The distance between the blade holders (50a, 50b) is longer to retain and increase the tension of the saw blade 70. The lever 63 is operable so as to vary the difference (C) between the distances (A, B), thereby achieving the objective of adjusting the tension of the saw blade 70.

Aside from the lever 63, further adjustments in the tension of the saw blade 70 can be achieved by rotating the lever 63 so as to rotate the connecting post 62 relative to the blade support 40. Because the connecting post 62 is connected threadedly to the blade support 40, rotation of the connecting post 62 results in upward or downward pivoting movement of the blade support 40, thereby adjusting the tension of the saw blade 70.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A scroll saw including a generally C-shaped saw frame, a flat worktable, a pair of spaced generally parallel upper and lower arms mounted pivotally on said saw frame, each of said upper and lower arms having a distal end and extending along upper and lower sides of said worktable, a saw blade, and a saw blade fastening and tension adjusting device for securing said saw blade between said upper and lower arms, wherein said saw blade fastening and tension adjusting device comprises:

a channel which opens downwardly and which is formed on said distal end of said upper arm, said channel having a top plate which is formed with a through hole and spaced side plates;

an elongated blade support having an inner end which extends into said channel and which is connected pivotally to said spaced side plates, said blade support having a distal end and a top surface which is formed with a screw hole that is aligned with said through hole in said channel;

an upper blade holder mounted on said distal end of said blade support, and a lower blade holder mounted on said distal end of said lower arm, said upper and lower blade holders holding removably and respectively two ends of said saw blade; and an adjustment unit including: a compression spring disposed between said top plate of said channel and said top surface of said blade support; a connecting post having a threaded lower end which extends through said through hole in said channel and said compression spring and which engages threadedly said screw hole in said blade support; and a lever having a front portion which is provided with a cam surface that abuts against said top plate of said channel and which is mounted pivotally on said connecting post, said lever being operable to move said connecting post axially and cause said blade support to pivot in order to vary distance between said upper and lower blade holders so as to adjust tension of said saw blade.

2. The scroll saw as claimed in claim 1, wherein said front portion of said lever has a front edge and a bottom edge, said cam surface including a curved face at said bottom edge and a flat face at said front edge.

* * * * *